3,759,859
EMULSION COPOLYMERIZATION
Paul J. Steinwand, Placentia, Calif., assignor to Union
  Oil Company of California, Los Angeles, Calif.
No Drawing. Continuation-in-part of abandoned application Ser. No. 884,030, Dec. 10, 1969. This application
  July 19, 1971, Ser. No. 163,997
Int. Cl. C08f *1/13, 15/40*
U.S. Cl. 260—29.7 T                                         9 Claims

ABSTRACT OF THE DISCLOSURE

Latex compositions suitable for use as adhesives and for application in carpet manufacturing are described wherein a rubbery copolymer of a conjugated aliphatic diolefin, an unsaturated comonomer and a minor amount of an ethylenically unsaturated carboxylic acid are copolymerized in an emulsion polymerization using a combination of surfactants found to be highly effective in the emulsification of comonomers and the resultant latex. Specifically disclosed is a combination of an ester of an alkali metal sulfoalkanedionic acid and a block polymer of polyoxypropylene and polyoxyethylene having a low to moderate content of polyoxyethylene units.

DESCRIPTION OF THE INVENTION

This is a continuation-in-part of application Ser. No. 884,030 filed Dec. 10, 1969, now abandoned.

The invention relates to latexes of rubbery copolymers and specifically to latexes of carboxylated rubbery copolymers and a method for their preparation.

The latexes of rubbery copolymers have been used for various coating applications such as for textile treatment, paper treatment, etc. The adhesion and internal cross-linking of the film resulting from the application of such latexes is improved by the interpolymerization of various ethylenically unsaturated carboxylic acid salts or esters thereof. These latexes are prepared by emulsion copolymerization wherein a conjugated aliphatic diene is copolymerized with various ethylenically unsaturated comonomers in the presence of the ethylenically unsaturated carboxylic acids which are thereby incorporated in the polymer chain. Emulsification of the comonomers and of the vinyl polymer product is achieved by incorporation of various surfactants in the polymerization medium and/or by the addition of various surface active agents to the latex after its formation. When carboxylic acids are introduced along the chain of the polymer by the copolymerization in the presence of such ethylenically unsaturated carboxylic acids, problems are encountered in achieving the optimum stability of the resulting latex. The presence of the carboxylic acids tends to form lumps and coagulates in the resulting latex, a condition which cannot be tolerated in the subsequent use of the latex as a coating composition or as an adhesive.

Various surfactants have been suggested for use in the emulsion copolymerization. Examples of such include many of the cationic, anionic and nonionic emulsifiers which are commonly known. I have now found that a synergistic effect on emulsification and stability of a rubbery copolymer latex can be achieved by the combined use of two particular types of surfactants. The combination of the two surfactants achieves emulsification and permits copolymerization to a degree not achievable by use of either surfactant alone. A combination of the two surfactants likewise produces a latex which is more stable and contains little or no coagulum or grit in contrast to the latex compositions produced by either of the two surfactants used alone.

The first component of the surfactant combination comprises a $C_1$ to $C_{12}$ alkyl or $C_5$ to $C_8$ cycloalkyl diester of an alkali metal sulfoalkanedionic acid. The alkanedionate can contain from 3 to about 8 carbons in the acid chain and examples of suitable compositions include the following: dimethyl sodium sulfomaleate, ethylmethyl lithium sulfoglutarate, diisopropyl potassium sulfosuccinate, diamyl sodium sulfosuccinate, diisobutyl potassium sulfoadipate, di(n-hexyl)sodium sulfomethylglutarate, di(2-ethylhexyl)lithium sulfosuccinate, di(n-octyl)lithium sulfosuccinate, dicyclopentyl sodium sulfomaleate, dimethyl cyclopentyl lithium sulfosuccinate, dicyclohexyl sodium sulfosuccinate, dimethylcyclohexyl lithium sulfoadipate, diethylcyclohexyl potassium sulfosuccinate, cycloheptyl sodium sulfosuccinate, etc. Of the aforementioned, the sulfosuccinates are preferred, the sodium salt is preferred, and the alkyl or cycloalkyl groups having from 3 to about 8 carbons are also preferred.

The second component of the surfactant combination comprises a block copolymer of polyoxypropylene and polyoxyethylene. These block copolymers contain a hydrophobic group formed from the polyoxypropylene base on which are condensed two polyoxyethylene branches. The particular block copolymers found effective in combination with the aforementioned alkali metal alkanedionate ester are those wherein the mol fraction of the polyoxyethylene comprises from 10 to about 70 weight percent of the block copolymer and wherein the molecular weight of the polyoxypropylene base is greater than 950 but less than 2900 minus 28 times the weight percent of polyoxyethylene. The latter compositions are commercially available from Wyandotte Chemicals under the trade designation of "Pluronics" and examples of commercially available materials having the aforementioned molecular weight of the polyoxypropylene base and polyoxyethylene mol fraction are Pluronic L-31, Pluronic L-44, and Pluronic L-81, among others.

The emulsifiers are used in minimal quantities, sufficient to effect emulsification and copolymerization. This amount can be from about 0.1 to about 7 weight percent, preferably from about 2.0 to 4.0 weight percent based on the amount of comonomers. The two components are used at proportions from 7/1 to 1/5, preferably from 3/1 to 1/2 parts of the ester component to the block copolymer component.

The emulsion copolymerization is performed with comonomers which yield rubbery copolymers. Examples of these are the copolymers formed by an aliphatic, conjugated diene having from about 4 to about 6 carbons together with various ethylenically unsaturated comonomers. Examples of suitable conjugated dienes include the conjugated hydrocarbon dienes and the halo substituted derivatives thereof, e.g., butadiene-1,3, 2-methyl butadiene-1,3  2,3-dimethylbutadiene-1,3, piperylene, 2-neopentyl butadiene-1,3, 2-chlorobutadiene-1,3, 2,3-dichlorobutadiene-1,3, pentadiene-2,4, hexadiene-1,3, hexadiene-3,5, etc. Of the aforementioned conjugated dienes, butadiene-1,3 and 2-chlorobutadiene-1,3 are preferred.

The comonomer which can be polymerized with the aforementioned conjugated diene in major proportions comprises any of the various comonomers commonly polymerized therewith. Examples of these include the vinyl and acrylic compounds such as styrene, acrylonitrile, methacrylonitrile, alpha-methylstyrene, alpha-chlorostyrene, etc. Of the aforementioned, styrene and acrylonitrile are preferred and for purposes of coating compositions, styrene is most preferred.

The aforementioned comonomers are employed in proportions that vary from about 35:65 to about 65:35 parts of the conjugated diene per parts of the ethylenically unsaturated comonomer. Preferably, the proportions of the conjugated diene to the unsaturated comonomer are from about 45:55 to about 55:45, particularly when a butadiene-styrene copolymer is prepared which is suitable for use as carpet backing.

The copolymerization of the conjugated diene and unsaturated comonomer is effected in the presence of a minor quantity of an ethylenically unsaturated, aliphatic, carboxylic acid. Aliphatic carboxylic acids which can be employed include the carboxylic acids having from 3 to about 8 carbons and include the unsaturated mono- and di-carboxylic acids such as acrylic, methacrylic, crotonic, vinyl acetic, tiglic, angelic, senecoic, hexenoic, tracryalic, maleic, fumaric, citriconic, mesaconic, glutaconic, itaconic, aconitic, ethylmaleic, methylitaconic, muconic, hydromuconic, etc. The aforementioned carboxylic acid is employed in minor quantities constituting from about 0.5 to about 5; preferably from about 1 to about 3 parts per 100 parts of the aforementioned rubbery comonomers.

A water soluble polymerization initiator is employed in the polymerization medium. The initiators are free radical catalysts, i.e., water soluble precursors of free radicals which can be thermally or chemically activated to release an effective amount of free radicals in the polymerization medium to initiate the polymerization of the comonomers. Examples of various initiators include the water soluble peracids and salts thereof, e.g., hydrogen peroxide, sodium peroxide, lithium peroxide, peracetic acid, persulfuric acid, the ammonium and alkali metal salts thereof, e.g., ammonium persulfate, sodium peracetate, lithium persulfate, potassium peracetate, etc. The free radical precursor can be used alone and thermally decomposed, or can be used in combination with a suitable chemical reducing agent in a redox system. The use of the redox system permits the release of the free radicals from the catalyst at a lower temperature than can be achieved by the thermal degradation of the free radical precursor. The lower temperature is desirable since this permits the achievement of a maximum molecular weight of the terpolymer. The reducing component of the redox system when employed is typically a salt of a multivalent metal in a lower oxidation state, e.g., ferrous chloride, cuprous sulfate, cobaltous chloride, etc., or an alkali metal metabisulfide, or an alkali metal salt of a formaldehyde sulfoxalate complex.

The free radical precursor is employed in a concentration from about 0.1 to about 0.6, preferably from about 0.3 to about 0.4 parts per 100 parts of the aforementioned rubbery comonomer. While all the catalyst can be charged to the reactor initially, it is preferred to add only about 9 to about 25 percent of the total catalyst required to the reaction system and, afer polymerization has been initiated, to add the remainder of the catalyst continuously thereafter. It has been found that the initial addition of lesser quantities of the catalyst results in undesirably prolonged induction periods while the initial addition of greater quantities of catalyst results in a lower monomer conversion.

The procedure for the emulsion copolymerization of the aforementioned monomers in the presence of the carboxylic acid functional monomer follows conventional procedure with the exception of the use of the particularly mentioned surfactant combination. In this copolymerization procedure, the comonomers are emulsified in an aqueous polymerization medium which is contained within a polymerization vessel, typically a jacketed kettle equipped with stirring means to thoroughly agitate the contents. A heating or cooling medium can be circulated through the jacket of the reactor to maintain the necessary temperature for effecting the polymerization which can be varied from about 100° to about 165° F., and preferably is from about 120° to about 150° F. Also, if desired, the polymerization can be initiated at the lower region of the aforementioned temperature range, e.g., from about 120° to about 140° F. and thereafter, when a substantial degree of polymerization has occurred as indicated by the presence of from about 15 to about 35 weight percent solids in the latex, the temperature can be elevated an increment of from 10° to about 40° F. to complete the reaction, thereby minimizing the content of residual monomer remaining after the copolymerization.

The polymerization can be effected batchwise, i.e., the product latex can be accumulated in the polymerization kettle during the entire reaction and recovered only after the polymerization has ceased, or can be practiced continuously wherein a continuous product stream of latex is removed from the reaction vessel.

The reactants, i.e., comonomers, catalysts, surfactant and polymerization medium can be charged to the reaction vessel in their entirety or can be added continuously to the reaction vessel as the copolymerization proceeds. Similarly, the entire mixture of the aforementioned combination of surfactant components can be added additionally to the aqueous polymerization medium at the outset of the reaction or can be continuously added with additional quantities of water during the polymerization.

The copolymerization of the aforementioned comonomers is practiced over a polymerization period from about 8 to about 36 hours. The polymerization can be initiated and maintained at the initial temperature for a period of approximately 4 to about 20 hours and thereafter a temperature can be raised to the more elevated temperature and the polymerization can be continued for an additional period of from about 4 to about 16 hours, sufficient to provide a latex composition having from about 40 to about 50 weight percent solids content.

The invention will now be described by reference to the illustrated modes of practice thereof which will also serve to demonstrate results obtainable thereby.

EXAMPLE

The copolymerization of butadiene and styrene in the presence of a mixture of acrylic and methacrylic acid was practiced in glass bombs which were tumbled at 12 r.p.m. and thermostatically maintained at 145° F. for 16 to 18 hours. The glass bomb was initially charged with 53 grams water, 0.2 gram potassium persulfate, 0.33 gram methacrylic acid, 0.67 gram acrylic acid, 25 grams butadiene and 25 grams styrene. The aforementioned components were emulsified into a stable emulsion by the addition to the aqueous medium of 1.2 grams Aerosol MA (dihexyl sodium sulfosuccinate), and 0.6 gram of various Pluronic L–64, L–61, L–31, L–81, L–44, P–84, F–38 and F–68.

Upon completion of the polymerization run for each of the aforementioned recipes, the bombs were opened and the latex was inspected for homogeneity and stability. It was observed that the latex compositions prepared with the Pluronic L–31, L–81 and L–44 had excellent stability with no detectable coagulant or grit. It was observed that the latex compositions prepared with the Pluronic L–64 and L–61 were of good stability with only a trace amount of grit. It was also observed that the latex compositions prepared with the Pluronic P–84, F–38 and F–68 failed to yield stable latex compositions but instead the solids coagulated in the latex. The successful block copolymer surfactants are included within the definition of from 10 to 70 weight percent polyoxyethylene and a molecular weight of polyoxypropylene greater than 950 but less than 2900 minus 28 times the polyoxyethylene weight percentage whereas the unsuccessful block copolymers are outside this definition.

The preceding example is intended solely to illustrate a mode of practice of the invention and demonstrate results attainable thereby. It is not intended that the example be unduly limiting of the invention, but rather that the scope of the invention include all disclosed and all obvious equivalents to the reagents and method steps of the preceding illustration.

I claim:

1. The emulsion copolymerization of a $C_4$–$C_6$ aliphatic conjugated hydrocarbon diene and chlorinated derivatives thereof with a comonomer selected from the group of styrene and acrylonitrile in proportions from about 65:35 to about 35:65 parts diene to parts comonomer in the presence of from 0.5 to 5.0 parts of an ethylenically unsaturated $C_3$ to $C_7$ mono- or di-carboxylic acid, a free radical catalyst and from 1 to about 7 parts of a surfactant comprising a mixture of a $C_1$–$C_8$ alkyl or $C_5$–$C_8$ cycloalkyl diester of an alkali metal $C_3$–$C_7$ sulfoalkanedionic acid and a polyoxypropylene-polyoxyethylene block copolymer having a polyoxyethylene content from 10 to 70 weight percent and a polyoxypropylene molecular weight greater than 950 units but less than:

2900 minus 28 (said weight percent of polyoxyethylene) and having 7/1 to 1/5 parts of said diester to parts of said block copolymer.

2. The copolymerization of claim 1 wherein said diene is butadiene-1,3 and said comonomer is styrene.

3. The copolymerization of claim 2 wherein said diester is an alkali metal sulfosuccinate.

4. The copolymerization of claim 3 wherein said alkali metal is sodium.

5. The copolymerization of claim 1 initiated at a temperature from 120° to 140° F. and the temperature is raised an increment of 10° to 40° F. when the solids content of the polymerization medium is from 15 to 35 weight percent.

6. The copolymerization of claim 3 wherein said diester is a $C_3$–$C_8$ alkyl or cycloalkyl diester of sodium sulfosuccinate.

7. The copolymerization of claim 6 wherein said diester is dihexyl sodium sulfosuccinate.

8. The copolymerization of claim 2 wherein said acids are present as a mixture of acrylic and methacrylic acids.

9. The copolymerization of claim 2 wherein said surfactant consists essentially of a $C_3$–$C_8$ alkyl or cycloalkyl ester of an alkali metal sulfosuccinate and said block copolymer.

References Cited

UNITED STATES PATENTS

| | | | |
|---|---|---|---|
| 3,256,234 | 6/1966 | Miller | 260—29.7 |
| 3,530,080 | 9/1970 | Inskip | 260—8 |

FOREIGN PATENTS

| | | | |
|---|---|---|---|
| 888,503 | 1/1962 | Great Britain | 260—29.7 |

OTHER REFERENCES

Kirk-Othmer, Ency. of Chem. Tech., 2nd Ed., vol. 8, 1965, pp. 127–132, 135–137.

Kirk-Othmer, Ency. of Chem. Tech., 2nd Ed., vol. 19, 1969, pp. 531–533, 553–554.

JOSEPH L. SCHOFER, Primary Examiner

J. KNIGHT, Assistant Examiner

U.S. Cl. X.R.

260—31.08 DR, 78.5 BB, 80.7, 80.8, 83.7